Feb. 9, 1960  W. G. PATRIQUIN  2,924,304
SHOCK ABSORBER WITH RECOIL CUSHION
Filed May 23, 1957  2 Sheets-Sheet 2

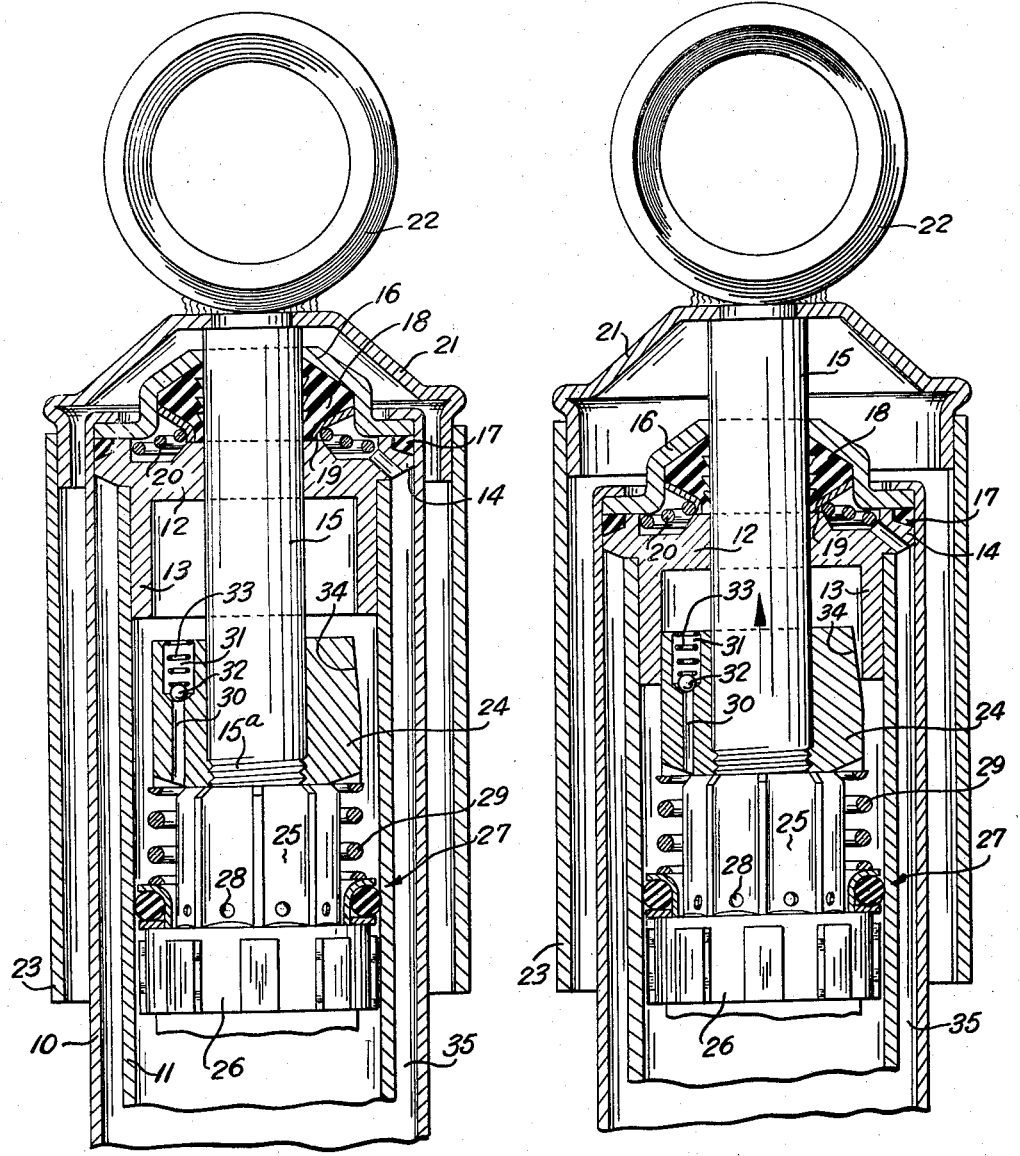

INVENTOR.
WILLIAM G. PATRIQUIN
BY Hudson, Boughton,
Williams, David & Hoffmann
ATTORNEYS United States Patent Office 2,924,304
Patented Feb. 9, 1960

2,924,304

SHOCK ABSORBER WITH RECOIL CUSHION

William G. Patriquin, Willoughby, Ohio, assignor to The Gabriel Company, Cleveland, Ohio, a corporation of Ohio Application May 23, 1957, Serial No. 661,090

4 Claims. (Cl. 188—88)

This invention relates to a direct double acting hydraulic shock absorber and, more particularly, to a shock absorber of this type which includes a hydraulic stop means functioning on the recoil or expansion stroke of the shock absorber.

Although shock absorbers embodying the invention are susceptible of various uses in different environments, for purposes of illustration and without limitation the shock absorber embodying the invention will be described herein as of a type especially adapted for use on motor vehicles.

An object of the invention is to provide in a direct double acting hydraulic shock absorber an improved and novel hydraulic recoil stop means effective to produce during the recoil or expansion stroke of the piston of the shock absorber gradually increasing hydraulic resistance to the movement of the piston.

Another object is to provide in a direct double acting hydraulic shock absorber a hydraulic recoil stop means as referred to above and which means is so constructed that the increasing hydraulic pressures occurring during its functioning are not applied directly to the cylinder of the shock absorber.

Another object of the invention is to provide in a direct double acting hydraulic shock absorber of the type wherein the piston of the shock absorber mounts externally an O-ring that performs the dual function of a piston packing and an impact or compression valve, an improved and novel hydraulic stop mechanism functioning during the recoil stroke of the piston and which mechanism serves to eliminate excessive hydraulic pressures on the O-ring, particularly during the latter part of said recoil stroke.

A still further object of the invention is to provide in a direct double acting hydraulic shock absorber of the type preferred to in the last object, an improved and novel hydraulic stop mechanism for the recoil stroke of the piston and which mechanism includes a part carried by the piston rod and, in addition to its hydraulic stop function, acting as an abutment for the spring which acts on the combined O-ring piston packing and impact or compression valve of the shock absorber.

Further and additional objects and advantages of the invention not hereinbefore specifically referred to will become apparent hereinafter during the detailed description of an embodiment of the invention which is illustrated in the accompanying drawings forming a part of this specification and wherein, Fig. 1 is a fragmentary longitudinal sectional view through a direct double acting hydraulic shock absorber embodying the invention with the piston shown in elevation, and with the parts of the shock absorber in substantially normal non-operating relationship.

Fig. 2 is a view similar to Fig. 1 but illustrates a relationship between the parts of the shock absorber occurring during the recoil or expansion stroke, i.e., when the piston has relative upward movement in the cylinder as indicated by the arrow on the piston rod.

Figure 3:
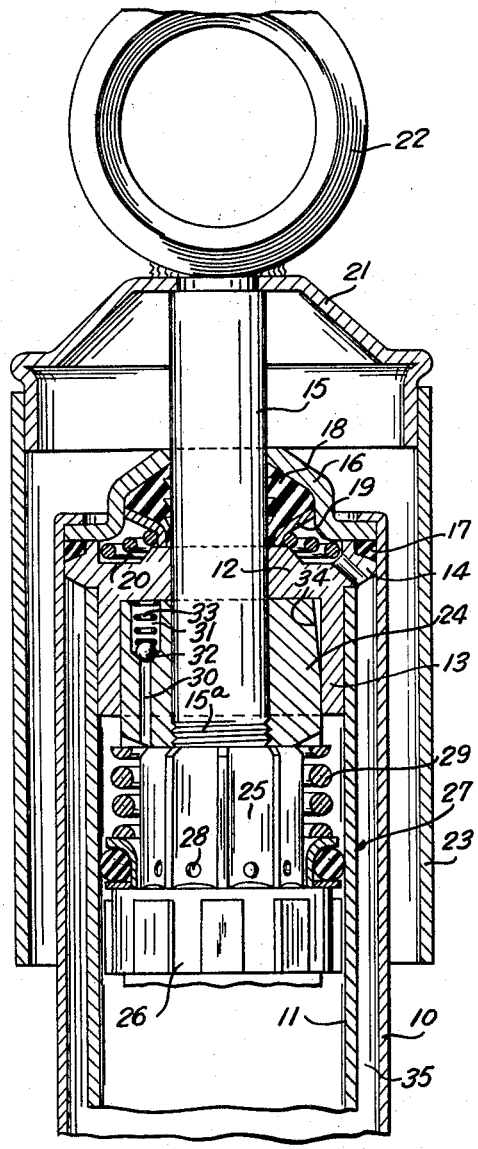
Fig. 3 is a view similar to Figs. 1 and 2 but illustrates an extreme relationship between the parts of the shock absorber, i.e., one wherein the piston is in its maximum upward relationship relative to the cylinder, it being understood that this relationship would be unlikely in actual operation due to a pressure lock occurring in the hydraulic stop mechanism.
Figure 4:
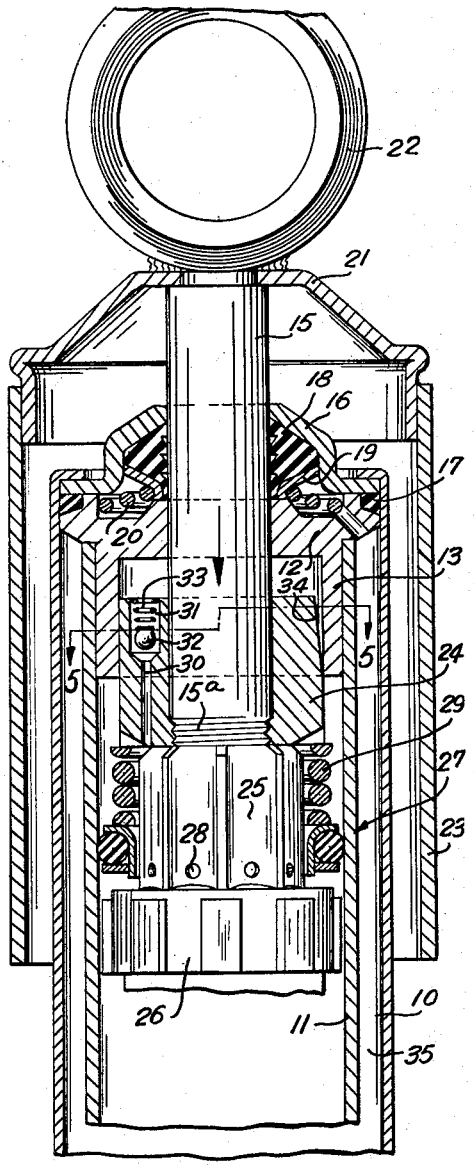
Figure 5:
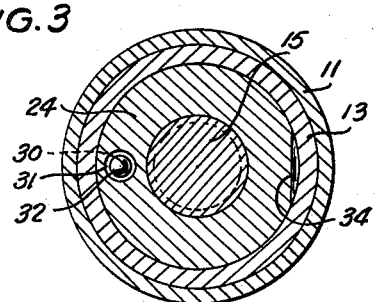

Fig. 4 is a view similar to Fig. 3 but illustrates the relationship of the parts of the shock absorber during the impact or compression stroke of the piston, i.e., when the piston is moving relatively downwardly in the cylinder as indicated by the arrow on the piston rod, and Fig. 5 is a transverse sectional view through the shock absorbers shown in Figs. 1 to 4 inclusive and is taken substantially along line 5—5 of Fig. 4 looking in the direction of the arrows.

The direct double acting hydraulic shock absorber shown in the drawings is of the telescopic type and includes an outer cylinder 10 having attached to one end thereof, i.e., its lower end as viewed in the drawings, a cap (not shown) provided with an attaching eye whereby this end of the shock absorber can be attached to the axle of the vehicle as will be well known in the art.

An inner or pressure cylinder 11 is concentrically disposed in radially spaced relationship within the cylinder 10 and has its lower end (not shown) connected to a compression head which, in turn, is connected to the cap at the lower end of the outer cylinder 10 and may be provided with suitable impact and replenishing valves as will be well understood in the art, as, for instance, the compression head and replenishing and impact valves carried thereby shown in Kieber Patent 2,518,553, issued August 15, 1950.

The upper end of the inner or pressure cylinder 11 is closed by a closure plug 12 which on its inner side has a downwardly or inwardly extending circular skirt member 13 which interfits the cylinder 11 for a purpose later to be pointed out.

The closure plug 12 exteriorly of the cylinder 11 is provided with a radially extending annular flange 14 that bears against the upper end of the inner cylinder 11 and interfits the interior of the upper end of the outer cylinder 10. The closure plug 12 is provided with a central opening therethrough in which slidably fits the piston rod 15 which will later be more specifically referred to.

A retainer cap 16 has a planular annular flange portion which bears against the outer side of the flange 14 of the closure plug 12 and against a gasket 17 carried by said flange and engaging the interior of the outer cylinder 10. The closure plug 12 may be welded or otherwise rigidly secured to the inner cylinder 11 while the upper end of the outer cylinder 10 is spun over the annular flange of the retainer cap 16 to structurally unite the outer cylinder 10, the closure plug 12 and the retainer cap 16. The retainer cap 16 is provided centrally with an outwardly extending housing portion in which is mounted a generally conical gasket 18 that functions as a piston rod packing. The lower side of the gasket 18 bears upon a washer 19 against which bears a coil spring 20 that is mounted in an annular channel formed on the outer side of the closure plug 12.

It will be understood that the piston rod 15 extends centrally through the retainer cap 16 and the piston rod packing gasket 18 and through the central opening in the closure plug 12 as is common in shock absorbers of this type. The piston rod 15 mounts at its upper or outer end an inverted cup-shaped cap 21 and also has fixedly secured to it on the upper or outer side of the cap 21 an attaching eye 22 whereby the upper end of the schock absorber can be connected to the frame of a motor vehicle as will be well understood in the art. The cap 21 has secured to the outer side of its annular wall a cylindrical depending shield 23 which surrounds the upper portion of the outer cylinder 10 in radially spaced relationship thereto.

The piston rod 15 adjacent its inner or lower end and within the inner cylinder 11 is externally threaded as indicated at 15a. A cylindrical member 24 forming part of the hydraulic recoil stop mechanism and also having a structural function as part of the piston of the shock absorber is provided with a central bore therethrough, the lower end of which is threaded so that said member can be screwed upon the lower end of the piston rod 15 as clearly indicated in the drawings.

As will later be more explicitly referred to the member 24 has an outside diameter such that it slidably interfits the interior of the circular skirt 13 of the closure plug 12. Also screwed upon the threads 15a of the piston rod 15 and abutting against the lower end of the member 24 is the smaller diameter portion 25 of the piston which also includes the larger diameter portion 26.

The smaller diamter piston portion 25 has its circumference spaced radially inwardly from the inner wall of the cylinder 11 while the larger diameter piston portion 26 slidably interfits the cylinder 11 and is provided on its circumference with a series of circularly spaced longitudinally extending grooves which have their upper ends closed by an impact valve assembly indicated in its entirety at 27 and including an O-ring that has the dual function of an impact valve and a piston packing.

The piston interiorly is provided with a recoil valve and with passages connected to the radial ports indicated at 28 in the piston portion 25. The construction of the piston has only been briefly described, inasmuch as it is well known in the art and is clearly illustrated and described in my Patent No. 2,507,267, issued May 9, 1950.

A coil spring 29 surrounds the smaller diameter piston portion 25 and has one end abutting the impact valve assembly to maintain the latter seated under spring load, the opposite end of said spring 29 abutting the lower end of the member 24, wherefore it will be seen that said member 24 has the daul function of a structural part of the piston and also of a part of the hydraulic recoil stop mechanism as will later be apparent.

The cylindrical plug member 24 is provided with a small bore 30 extending from the lower end of said member longitudinally thereof and communicating with a counterbore 31 that extends to the upper end of the member 24. The inner or lower ends of the counterbore 31 where it communicates with the bore 30 is provided with a conical seat on which seats a ball valve 32 under the load of a valve spring 33 mounted in the counterbore 31 and suitably retained therein as by peened over portions of the upper or outer end of the wall of the counterbore.

The circumference of the member 24 is provided with a chordal flat 34 that extends longitudinally of the member 24 from the upper end thereof, but terminates short of the lower end of said member. The chordal flat 34 is illustrated as extending longitudinally of the member substantially half way of its longitudinal length but it will be understood said flat under various conditions could have a different longitudinal length than that shown.

The chordal flat 34 inclines in its longitudinal length inwardly from the circumference of the member 24 toward the axis of said member in the direction of the upper end of the member. Consequently the space between the chordal flat 34 and the inner circumference of the circular skirt 13 varies in width from substantially zero to maximum width with the latter width being located at the upper end of the member 24.

It may be assumed that the shock absorber embodying the invention is mounted on a motor vehicle and that Fig. 1 of the drawing illustrates the relationship of the parts of the shock absorber when the latter are in normal rest position. It will be noted that the cylindrical member 24 is separated from the circular skirt member 13 of the closure plug 12 longitudinally of the shock absorber and that the impact valve assembly 27 is in seated position. Now assuming that the vehicle springs expand as would occur if the wheels hit a road depression, there would occur relative upward movement of the piston in the cylinder 11 such as occurs during the recoil stroke. During the recoil stroke the impact valve assembly 27 remains seated and when sufficient hydraulic pressure is developed on the recoil side of the piston the oil on the recoil side can flow through the ports 28 and through the now open recoil valve (not shown) located interiorly of the piston to reach the opposite or impact side of the piston. As the recoil stroke continues in the direction of the arrow in Fig. 2 the member 24 of the hydraulic recoil stop mechanism enters the circular skirt 13. During the first part of this entering movement of the member 24 oil within the circular skirt can flow relatively freely from the interior of the skirt into the recoil side of the cylinder 11 through the space between the chordal flat 34 and the inner wall of the skirt. However, as this movement of the member 24 into the skirt 13 progresses this space gradually diminishes in capacity for the flowing oil and the flow of oil from within the skirt to the recoil side of the piston progressively decreases in volume.

When the member 24 has telescoped within the skirt 13 a sufficient distance to cause the chordal flat 34 to be entirely within the skirt then the complete circumference of the member 24 has sliding contact with the inner circumference of the skirt and the flow of oil from within the skirt into the cylinder 11 is substantially completely stopped.

When this condition has obtained the hydraulic pressure within the skirt rapidly builds up and would reach a pressure maximum that would function substantially as a hydraulic lock against further relative recoil movement of the piston. This hydraulic lock would prevent bottoming of the upper end of the member 24 against the closure plug 12 unless very extreme operating conditions existed. It will be understood that in Fig. 3 the relationship of the parts is illustrated for such extreme and unusual condition.

A direct double acting hydraulic shock absorber of the general type hereinbefore described and which does not include the hydraulic recoil stop mechanism embodying the invention develops in the working cylinder very high hydraulic pressures on the recoil side of the piston near the end of the recoil stroke and these pressures exert excessive pressures on the O-ring of the impact valve assembly.

In a shock absorber embodying the present invention it will be noted that the very high hydraulic pressures produced during the recoil stroke occur within the skirt 13 as the member 24 moves progressively into the skirt and hence these high pressures are not exerted directly on the O-ring of the impact valve assembly.

Also it will be noted that the very high pressures developed near the end of the recoil stroke are within the skirt 13 and hence are not applied directly to the cylinder 11 since at the location where the pressures develop the skirt 13 interfits the inner wall of the cylinder 11 and reenforces the latter.

When the wheels of the vehicle strike a roadway elevation the vehicle springs are compressed and the piston of the shock absorber will move relative to the cylinder 11 in its impact stroke. During the impact stroke of the piston the latter moves relatively toward the lower end of the cylinder 11 as indicated by the arrow on the piston rod 15 in Fig. 4. When the pressure on the impact side of the piston reaches a predetermined pressure during the impact stroke the impact valve assembly 27 moves to unseated position against the load of the spring 29 so the oil can flow from below the piston to the upper side thereof as will be well understood.

As the impact stroke of the piston progresses the member 24 gradually recedes from the interior of the skirt 13 but during this separation of the skirt and member 24 the ball valve 32 will unseat against the spring load 33 due to hydraulic pressure so that oil can flow to the upper end of the member 24 and into the skirt 13 through the bore 30 and counterbore 31 to keep the skirt 13 filled with oil and to prevent cavitation.

It will be understood that during the impact stroke of the piston the oil in the cylinder 11 displaced by the entering member 24 and piston rod 15 can flow through the open impact valve of the compression head assembly (not shown) to the reservoir 35 which is the annular space between the inner and outer cylinders 11 and 10. Also it will be understood that during the recoil stroke of the piston oil can flow from the reservoir through the replenishing valve of the compression head assembly (not shown) and into the cylinder 11 below the piston to prevent cavitation and to compensate for the withdrawal from the cylinder 11 of a substantial length of the piston rod 15.

Although a preferred embodiment of the invention has been illustrated and described herein it will be understood that the invention is susceptible of various modifications and adaptations within the scope of the appended claims.

Having thus described my invention what I claim is:

1. A direct double acting hydraulic shock absorber having a cylinder providing a working chamber, a closure plug mounted at one end of said cylinder and provided with a central opening, a piston rod reciprocably extending through said opening and into the working chamber provided by said cylinder, the other end of said cylinder being adapted to mount a compression head, a piston mounted on said piston rod and reciprocable in said cylinder and provided with separate valve controlled impact and recoil passages for the flow of oil therethrough during the impact and recoil strokes of the piston; a recoil stroke hydraulic stop mechanism comprising an annular skirt member fixed to and extending from said closure plug inwardly of said cylinder and interfitting the latter and having its lower open end facing said piston and communicating downwardly with the interior of said cylinder, a cylindrical plug member fixedly secured on said piston rod at the end of said piston which is toward said skirt member and of an external diameter such as to slidably interfit the interior of said skirt member and be spaced radially inwardly of said cylinder, said skirt member and said cylindrical plug member being of a longitudinal length such as to have telescopic interengagement during the latter portion of the recoil stroke of the piston, one of said members being provided with longitudinally extending means co-operating with the other of said members to produce a variable capacity bleed passage between said members during the initial portion of their telescopic engagement and communicating downwardly directly with the interior of said cylinder, said cylindrical plug member being provided with bore means extending longitudinally of the member between its ends, and valve means in said bore means adapted to open said bore means only during the impact stroke of the piston.

2. A direct double acting hydraulic shock absorber as defined in claim 1 wherein said longitudinally extending means consists of a chordal flat formed on one of said members and inclined in its longitudinal length relative to the longitudinal center line of the piston rod.

3. A direct double acting hydraulic shock absorber as defined in claim 1 wherein said longitudinally extending means is a chordal flat formed on said cylindrical plug member and inclined in its longitudinal length from the circumference of said member intermediate its ends inwardly to the end thereof that is adjacent to said annular skirt member.

4. A direct double acting hydraulic shock absorber as defined in claim 1 wherein said piston includes a larger diameter portion slidable in said cylinder and provided on its circumference with longitudinally extending passages and a smaller diameter portion spaced radially inwardly of said cylinder and secured to said piston rod, an O-ring assembly slidable on said smaller diameter piston portion with the O-ring thereof engaging said cylinder and acting as a piston packing and as a valve controlling the longitudinal passages on said larger diameter piston portion, said cylinder plug member of said recoil stroke hydraulic stop mechanism engaging the end of said smaller diameter piston portion, and a coil spring surrounding said smaller piston portion with one end thereof abutting said O-ring assembly and the other end thereof abutting said cylindrical plug member.

References Cited in the file of this patent

UNITED STATES PATENTS

| 1,387,706 | Gruss | Aug. 16, 1921 |
| 1,621,261 | Lomar | Mar. 15, 1927 |
| 2,349,244 | Brown | May 23, 1944 |
| 2,606,630 | Rossman | Aug. 12, 1952 |
| 2,756,989 | Peras | July 31, 1956 |
| 2,783,859 | Patriquin | Mar. 5, 1957 |
| 2,810,571 | Ferguson et al. | Oct. 22, 1957 |

FOREIGN PATENTS

| 158,802 | Australia | Sept. 14, 1954 |
| 758,222 | Great Britain | Oct. 3, 1956 |